(12) United States Patent
Kataoka

(10) Patent No.: US 11,407,317 B2
(45) Date of Patent: Aug. 9, 2022

(54) VEHICULAR GAS SUPPLY SYSTEM

(71) Applicant: Toyota Jidosha Kabushiki Kaisha, Toyota (JP)

(72) Inventor: Chiaki Kataoka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 444 days.

(21) Appl. No.: 16/695,858

(22) Filed: Nov. 26, 2019

(65) Prior Publication Data
US 2020/0180445 A1 Jun. 11, 2020

(30) Foreign Application Priority Data
Dec. 10, 2018 (JP) .............................. JP2018-231156

(51) Int. Cl.
*H01M 8/04* (2016.01)
*B60L 50/72* (2019.01)
*H01M 8/04082* (2016.01)

(52) U.S. Cl.
CPC ......... *B60L 50/72* (2019.02); *H01M 8/04201* (2013.01); *H01M 2250/20* (2013.01)

(58) Field of Classification Search
CPC ............... B60L 50/72; H01M 8/04201; H01M 2250/20
See application file for complete search history.

(56) References Cited

U.S. PATENT DOCUMENTS

| 4,085,860 | A | 4/1978 | Hawkins et al. |
| 10,054,267 | B2* | 8/2018 | Yersak .................. F17C 13/083 |
| 11,125,392 | B2* | 9/2021 | Abd Elhamid ........... F17C 5/06 |
| 2015/0260347 | A1 | 9/2015 | Noguchi |
| 2017/0343162 | A1 | 11/2017 | Yersak et al. |

FOREIGN PATENT DOCUMENTS

| CN | 107435813 A | 12/2017 |
| CN | 208074577 U | 11/2018 |
| JP | 2005-315294 A | 11/2005 |
| JP | 2008-291891 A | 12/2008 |
| JP | 2009-121568 A | 6/2009 |
| JP | 2015-175416 A | 10/2015 |
| JP | 2016-528452 A | 9/2016 |
| WO | 2015017844 A1 | 2/2015 |

* cited by examiner

*Primary Examiner* — John D Walters
(74) *Attorney, Agent, or Firm* — Dinsmore & Shohl LLP

(57) ABSTRACT

A gas supply system has a chamber, a front manifold, a circulation pipe, and a fusible plug valve. The chamber stores hydrogen gas. The front manifold is connected to the chamber, and hydrogen gas flows through the front manifold. The circulation pipe is provided such that hydrogen gas can flow through the front manifold, and has higher thermal conductivity than the chamber. The fusible plug valve is provided in the front manifold apart from the chamber. Heat is transferred to the fusible plug valve from the circulation pipe. The fusible plug valve discharges the hydrogen gas in the chamber and the hydrogen gas in the front manifold to the outside by being opened at a temperature equal to or higher than a predetermined opening temperature.

6 Claims, 9 Drawing Sheets

VEHICULAR GAS SUPPLY SYSTEM

CROSS-REFERENCE TO RELATED APPLICATIONS

This application claims priority to Japanese Patent Application No. 2018-231156 filed on Dec. 10, 2018, which is incorporated herein by reference in its entirety including the specification, drawings and abstract.

BACKGROUND

1. Technical Field

The disclosure relates to a vehicular gas supply system.

2. Description of Related Art

In Japanese Patent Application Publication No. 2015-175416 (JP 2015-175416 A), there is disclosed a gas storage tank that is equipped with a tank body that stores gas, a safety valve that discharges the gas stored in the tank body when heated to a temperature equal to or higher than a predetermined temperature, a transfer member that transfers heat to the safety valve, and an adiabatic member that covers at least part of the transfer member.

SUMMARY

By the way, in the gas storage tank of Japanese Patent Application Publication No. 2015-175416 (JP 2015-175416 A), the safety valve as a discharge portion is directly connected to the tank body as a container. Therefore, when the temperature of a periphery of the container and the transfer member becomes high, part of the heat that should be transferred from the transfer member to the discharge portion is consumed to raise the temperature of the container. Therefore, the temperature of the discharge portion may become unlikely to rise. The unlikeliness of the temperature of the discharge portion to rise means that the start of the operation of discharging gas at the discharge portion in its high-temperature state is delayed. Thus, in a configuration having the discharge portion that discharges the gas in the container by being opened at a temperature equal to or higher than a predetermined opening temperature, there is room for improvement in restraining the start of the operation of discharging gas at the discharge portion in its high-temperature state from being delayed.

In view of the foregoing fact, it is an object of the disclosure to obtain a vehicular gas supply system that can restrain the start of an operation of discharging gas at a discharge portion in its high-temperature state from being delayed in a configuration having the discharge portion, which discharges gas in a container by being opened at a temperature equal to or higher than a predetermined opening temperature.

A vehicular gas supply system according to a first aspect of the disclosure has a container that stores gas, a flow channel portion that is connected to the container and through which gas flows, a pipeline that is provided such that gas can flow through the flow channel portion, and that has higher thermal conductivity than the container, and a discharge portion that is provided at the flow channel portion apart from the container, that has heat transferred thereto from the pipeline, and that discharges gas in the container and gas in the flow channel portion to an outside by being opened at a temperature equal to or higher than a predetermined opening temperature.

In the vehicular gas supply system according to the first aspect, when the temperature of a peripheral portion of the container including the pipeline becomes high, heat is transferred in the pipeline. The pipeline has higher thermal conductivity than the container, so the speed of heat transfer in the pipeline is higher than the speed of heat transfer in the container. Then, this heat is transferred from the pipeline to the discharge portion. The temperature of the discharge portion rises through the supply of heat thereto from the pipeline. When the temperature of the discharge portion becomes equal to or higher than the predetermined opening temperature, part of the gas in the container and part of the gas at the flow channel portion are discharged from the discharge portion to the outside through the opening of the discharge portion. Thus, the pressure of the gas inside the container becomes low.

It should be noted herein that the discharge portion is provided at the flow channel portion apart from the container. Therefore, the heat that is transferred from the pipeline to the discharge portion is not transferred to the container to be consumed. Thus, the temperature of the discharge portion is restrained from becoming unlikely to rise. That is, the rise in temperature of the discharge portion becomes unlikely to be suppressed before the temperature of the discharge portion becomes equal to the predetermined opening temperature. Therefore, the start of the operation of discharging gas at the discharge portion in its high-temperature state can be restrained from being delayed.

A vehicular gas supply system according to a second aspect of the disclosure may have the following feature. That is, the discharge portion and the pipeline may be held in contact with each other.

In the vehicular gas supply system according to the second aspect, the discharge portion and the pipeline are held in contact with each other, so there is no need to separately provide a member that transfers heat from the pipeline to the discharge portion. Therefore, the number of parts can be restrained from increasing.

A vehicular gas supply system according to a third aspect of the disclosure may have the following feature. That is, the vehicular gas supply system may be provided with a transfer member that is held in contact with the discharge portion and the pipeline and that transfers heat from the pipeline to the discharge portion.

In the vehicular gas supply system according to the third aspect, even with a configuration that makes it difficult to hold the discharge portion and the pipeline in contact with each other, the transfer member is held in contact with the discharge portion and the pipeline, so heat is transferred from the pipeline to the discharge portion. Thus, heat can be transferred from the pipeline to the discharge portion regardless of the arrangement of the discharge portion and the pipeline, so the degree of freedom in arranging the discharge portion and the pipeline can be enhanced.

A vehicular gas supply system according to a fourth aspect of the disclosure may have the following feature. That is, the pipeline may be a circulation pipeline that circulates the gas that has flowed from the container to the flow channel portion.

In the vehicular gas supply system according to the fourth aspect, the gas that has flowed from the container to the circulation pipeline flows through the interior of the circulation pipeline and then to the flow channel portion, and hence is circulated. It should be noted herein that heat is transferred from the circulation pipeline to the discharge portion when the temperature of part of the circulation pipeline becomes high. Thus, the transfer of heat in the circulation pipeline makes it unnecessary to provide a pipeline for heat transfer and the circulation pipeline separately from each other. Therefore, the number of parts can be restrained from increasing.

A vehicular gas supply system according to a fifth aspect of the disclosure may have the following feature. That is, the flow channel portion may be arranged in front of the container in a longitudinal direction of a vehicle, and the pipeline may be a filling pipeline that is filled with gas from a region behind the flow channel portion with respect to the vehicle toward the flow channel portion.

In the vehicular gas supply system according to the fifth aspect, the flow channel portion is arranged on the front side in the longitudinal direction of the vehicle, so the discharge portion is also arranged on the front side in the longitudinal direction of the vehicle. Moreover, the filling pipe is filled with gas toward the flow channel portion located on the front side in the longitudinal direction of the vehicle. It should be noted herein that the heat produced on the rear side of the vehicle is transferred to the discharge portion via the filling pipeline when the temperature of the rear side of the vehicle becomes high. In this manner, the transfer of heat in the filling pipeline makes it unnecessary to provide a pipeline for heat transfer and the filling pipe separately from each other. Therefore, the number of parts can be restrained from increasing.

A vehicular gas supply system according to a sixth aspect of the disclosure may have the following feature. That is, the flow channel portion may be arranged behind the container in the longitudinal direction of the vehicle, and the pipeline may be a supply pipeline that is extended forward with respect to the vehicle from the flow channel portion and that is supplied with gas from the flow channel portion.

In the vehicular gas supply system according to the sixth aspect, the flow channel portion is arranged on the rear side in the longitudinal direction of the vehicle, so the discharge portion is also arranged on the rear side in the longitudinal direction of the vehicle. Moreover, the supply pipe is filled with gas from the front side of the vehicle toward the flow channel portion located on the rear side in the longitudinal direction of the vehicle. It should be noted herein that the heat produced on the front side of the vehicle is transferred to the discharge portion via the supply pipeline when the temperature of the front side of the vehicle becomes high. In this manner, the transfer of heat in the supply pipeline makes it unnecessary to provide a pipeline for heat transfer and the supply pipeline separately from each other. Therefore, the number of parts can be restrained from increasing.

According to the disclosure, the start of the operation of discharging gas at the discharge portion in its high-temperature state can be restrained from being delayed in the configuration having the discharge portion, which discharges gas in the container by being opened at a temperature equal to or higher than the predetermined opening temperature.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
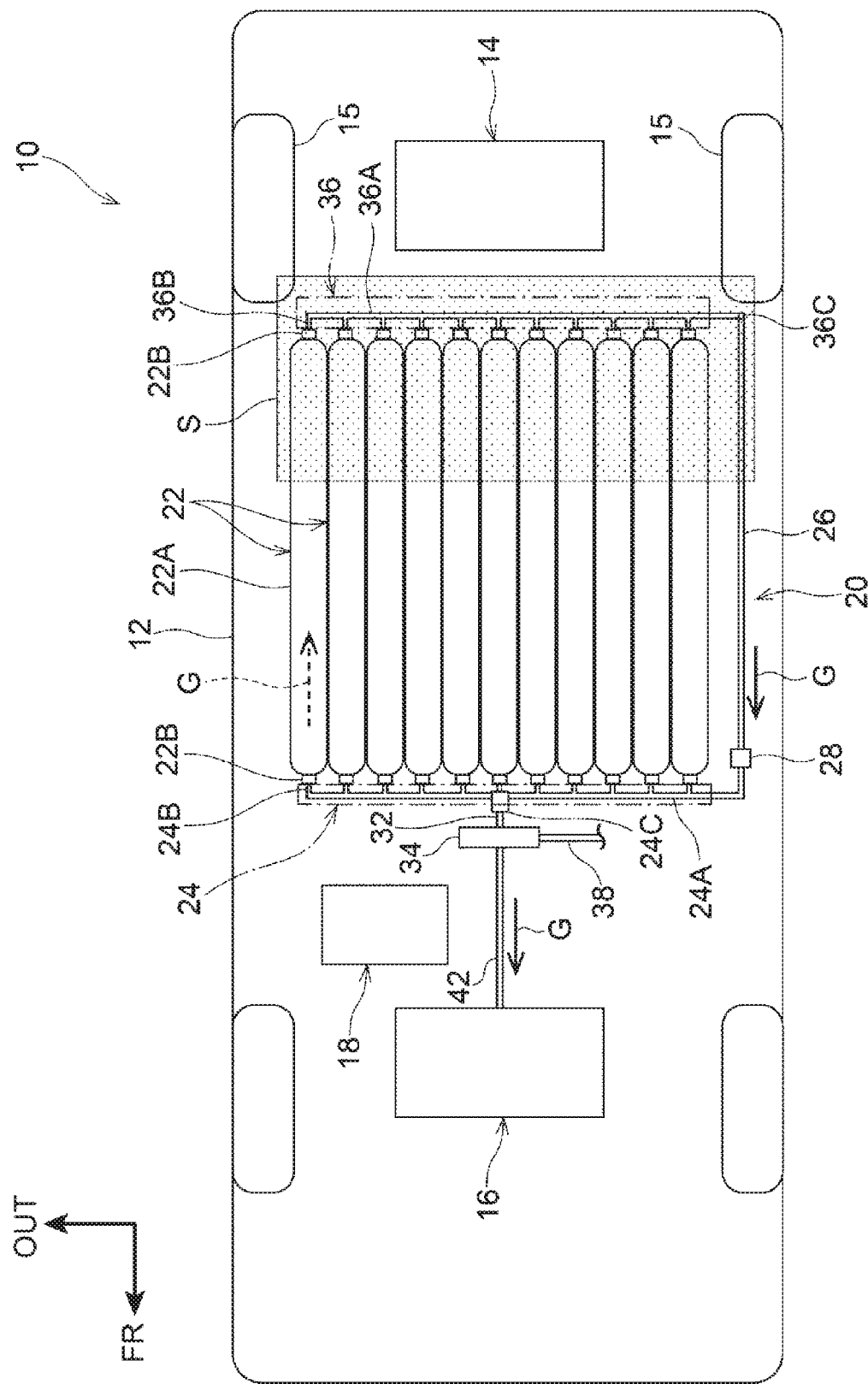
FIG. 1 is a plan view showing part of a vehicle to which a gas supply system according to the first embodiment is applied.

FIG. 1 shows part of a vehicle 10 to which a gas supply system 20 as an exemplary vehicular gas supply system according to the first embodiment is applied. Incidentally, arrows FR, UP, and OUT shown appropriately in the respective drawings denote a forward direction (a traveling direction) of the vehicle, an upward direction of the vehicle, and an outward direction in a vehicle width direction, respectively. When the following description is given simply through the use of a longitudinal direction, a vertical direction, and a lateral direction, the longitudinal direction of the vehicle, the vertical direction of the vehicle, and the lateral direction as the vehicle width direction in the case where the vehicle is directed in the traveling direction will be meant respectively, unless otherwise specified.

The vehicle 10 is configured to include a vehicle body 12, a drive motor 14, rear wheels 15, a fuel cell stack 16, a control unit 18, and the gas supply system 20. The control unit 18 is configured as a computer including a central processing unit (a CPU), a read only memory (a ROM), and a random access memory (a RAM), and performs operation control of various parts of the vehicle 10. The drive motor 14 rotates the rear wheels 15 by being driven through the inputting of command information thereto from the control unit 18.

For example, the fuel cell stack 16 is arranged at a front portion of the vehicle. Besides, the fuel cell stack 16 generates electric power through an electrochemical reaction between hydrogen gas G that is supplied from the gas supply system 20, which will be described later, and compressed air that is supplied from an air compressor (not shown). Part of the electric power generated by the fuel cell stack 16 is used to drive the drive motor 14.

In the following description, thermal conductivity is a value obtained by dividing an amount of heat flowing thorough a unit area perpendicular to the flow of heat per unit time by a difference in temperature per unit length. For reference, the thermal conductivity of aluminum is 236 (W/m·K), the thermal conductivity of copper is 398

(W/m·K), the thermal conductivity of stainless steel is 84 (W/m·K), and the thermal conductivity of air is 0.02 (W/m·K).

Incidentally, in FIG. 1, a hatched region S is a virtual region that is assumed to be heated by a heat source (not shown). In the region S, peripheral portions of chambers 22 including a later-described circulation pipe 26 are arranged.

[Configuration]

Next, the gas supply system 20 will be described.

The gas supply system 20 has the chambers 22 as exemplary containers, a front manifold 24 as an exemplary flow channel portion, the circulation pipe 26 as an exemplary pipeline and an exemplary circulation pipeline, and a fusible plug valve 28 as an exemplary discharge portion. Besides, the gas supply system 20 is provided with a connection pipe 32, a changeover valve 34, a rear manifold 36, a filling pipe 38, and a delivery pipe 42. The gas supply system 20 is arranged, with respect to the vehicle, below a floor panel (not shown) that constitutes a floor portion of a vehicle interior of the vehicle 10, and is held by a holder portion (not shown).

⟨Chamber⟩

Each of the chambers 22 is extended in the longitudinal direction of the vehicle as an example of one direction, and is configured as a tank formed substantially in the shape of a cylinder whose central axis extends in the longitudinal direction of the vehicle. For example, the 11 chambers 22 are aligned at equal intervals in the vehicle width direction. The 11 chambers 22 are identical in configuration. Therefore, a reference numeral is assigned to only two of the chambers 22, and the reference numeral of the nine remaining chambers 22 is omitted. Front end portions of the 11 chambers 22 in the longitudinal direction of the vehicle are aligned in position, and rear end portions of the 11 chambers 22 in the longitudinal direction of the vehicle are aligned in position. Each of the chambers 22 stores hydrogen gas G as an exemplary gas.

Furthermore, each of the chambers 22 has a body portion 22A in which hydrogen gas G is stored, and ferrules 22B provided at both end portions of the body portion 22A in the longitudinal direction of the vehicle. The body portion 22A is formed in the shape of a cylinder whose both end portions in the longitudinal direction of the vehicle are open. Besides, the body portion 22A is made of, for example, stainless steel. The ferrules 22B close up both the end portions of the body portion 22A in a partially openable manner respectively. The rear end portions of the chambers 22 in the longitudinal direction of the vehicle are arranged in the region S.

⟨Front Manifold⟩

The front manifold 24 is arranged in front of the 11 chambers 22 in the longitudinal direction of the vehicle. Besides, the front manifold 24 has, for example, a single main pipe 24A, a plurality of (11) branch pipes 24B branched off from the main pipe 24A, and a connection portion 24C. A left end portion of the main pipe 24A in the vehicle width direction is flexed backward with respect to the vehicle. Besides, the left end portion of the main pipe 24A is arranged apart from a front end portion of the chamber 22 arranged leftmost in the vehicle width direction, outside (on a left side) in the vehicle width direction.

Rear end portions of the branch pipes 24B are connected to the ferrules 22B located on a front side with respect to the vehicle, respectively. That is, the front manifold 24 is connected to one end portion of each of the chambers 22 in the longitudinal direction of the vehicle, and hydrogen gas G flows therein. The connection portion 24C is provided at a central portion of the main pipe 24A in the vehicle width direction. Besides, the connection portion 24C is equipped with a single pipe portion (not shown) that is held in communication with an interior of the main pipe 24A and that extends in the longitudinal direction of the vehicle. This pipe portion is opened forward with respect to the vehicle.

⟨Rear Manifold⟩

The rear manifold 36 is arranged behind the 11 chambers 22 in the longitudinal direction of the vehicle. Besides, the rear manifold 36 has, for example, a single main pipe 36A extended in the vehicle width direction, a plurality of (11) branch pipes 36B branched off from the main pipe 36A, and a connection portion 36C. A left end portion of the main pipe 36A in the vehicle width direction is connected to the connection portion 36C, which will be described later, in the vehicle width direction.

Front end portions of the branch pipes 36B are connected to the ferrules 22B located on a rear side with respect to the vehicle, respectively. The connection portion 36C is equipped with a single pipe portion (not shown) having an opening portion opened inward in the vehicle width direction and an opening portion opened forward in the longitudinal direction of the vehicle. Then, the connection portion 36C connects the left end portion of the main pipe 36A and a rear end portion of the later-described circulation pipe 26 in the longitudinal direction of the vehicle to each other. Besides, for example, the rear manifold 36 is arranged in the region S.

⟨Circulation Pipe⟩

The circulation pipe 26 has higher thermal conductivity than the chambers 22. For example, the circulation pipe 26 is a pipe made of aluminum (or aluminum alloy). Besides, the circulation pipe 26 is arranged apart from the chamber 22 arranged leftmost in the vehicle width direction, outside (on the left side) in the vehicle width direction. Furthermore, the circulation pipe 26 is extended with a central axis thereof coinciding with the longitudinal direction of the vehicle. For example, the length of the circulation pipe 26 in the longitudinal direction of the vehicle is approximately equal to the length of the chambers 22 in the longitudinal direction of the vehicle.

A front end portion of the circulation pipe 26 in the longitudinal direction of the vehicle is connected to the fusible plug valve 28, which will be described later. The rear end portion of the circulation pipe 26 is connected to the connection portion 36C. Thus, the circulation pipe 26 circulates (recirculates) the hydrogen gas G that has flowed from the chambers 22 to the circulation pipe 26 through the rear manifold 36 to the chambers 22 again, via the fusible plug valve 28 and the front manifold 24. In other words, the circulation pipe 26 is provided such that hydrogen gas G can flow through the front manifold 24. The rear portion of the circulation pipe 26 in the longitudinal direction of the vehicle is arranged in the region S. Incidentally, the circulation pipe 26 has the function of restraining the temperature in the chambers 22 from becoming locally high, by circulating the hydrogen gas G in the chambers 22 via the circulation pipe 26 in filling the chambers 22 with hydrogen gas.

⟨Fusible Plug Valve⟩

The fusible plug valve 28 connects the front end portion of the circulation pipe 26 and a rear end portion of the main pipe 24A to each other in the longitudinal direction of the vehicle. In other words, the fusible plug valve 28 and the circulation pipe 26 are held in contact with each other in the longitudinal direction of the vehicle. Besides, the fusible plug valve 28 is arranged apart from the front end portion of the chamber 22 arranged leftmost in the vehicle width direction, outside (on the left side) in the vehicle width direction. Thus, the fusible plug valve 28 is provided in the front manifold 24 apart from the chambers 22, and heat can be transferred to the fusible plug valve 28 from the circulation pipe 26.

In concrete terms, the fusible plug valve 28 is structured to be opened by partially fusing when the temperature of the fusible plug valve 28 itself reaches a predetermined opening temperature (e.g., 150 (° C.)) through heating. It should be noted herein that hydrogen gas G is not discharged to the outside of the fusible plug valve 28 when the temperature of the fusible plug valve 28 itself is lower than the predetermined opening temperature. Therefore, the hydrogen gas G caused to flow into the fusible plug valve 28 from the circulation pipe 26 is caused to flow to the front manifold 24.

On the other hand, when the fusible plug valve 28 partially fuses to be opened, the hydrogen gas G caused to flow into the fusible plug valve 28 is discharged, for example, from the fusible plug valve 28 to the outside in the vehicle width direction. In other words, the fusible plug valve 28 discharges the hydrogen gas G in the chambers 22 and the hydrogen gas G in the front manifold 24 to the outside by being opened at a temperature equal to or higher than the predetermined opening temperature. Thus, the pressure of hydrogen gas G is restrained from rising in each of the chambers 22. Incidentally, the fusible plug valve 28 is opened independently of an operation of opening/closing the changeover valve 34 that will be described later.

⟨Connection Pipe⟩

The connection pipe 32 is extended forward, for example, along the longitudinal direction of the vehicle from a central region of the front manifold 24 in the vehicle width direction (a central region thereof in a direction in which the chambers 22 are laid out). A rear end portion of the connection pipe 32 is connected to the connection portion 24C. A front end portion of the connection pipe 32 is connected to the changeover valve 34 that will be described later.

⟨Filling Pipe⟩

The filling pipe 38 is extended from a filling port (not shown) provided at a left portion of the vehicle 10 to the changeover valve 34. Part of the filling pipe 38 is extended in the vehicle width direction. Besides, the filling pipe 38 is used when the gas supply system 20 is filled with hydrogen gas G from outside the vehicle 10.

⟨Delivery Pipe⟩

The delivery pipe 42 is extended in the longitudinal direction of the vehicle from the changeover valve 34 to the fuel cell stack 16. Moreover, the delivery pipe 42 supplies the fuel cell stack 16 with the hydrogen gas G caused to flow into the delivery pipe 42 through the changeover valve 34.

⟨Changeover Valve⟩

The changeover valve 34 is configured as a three-way valve. Besides, the changeover valve 34 is connected to the front end portion of the connection pipe 32, an inner end portion of the filling pipe 38 in the vehicle width direction, and a rear end portion of the delivery pipe 42. Moreover, the changeover valve 34 is configured to, for example, make a changeover among three states, based on command information from the control unit 18. The three states are a filling state where the connection pipe 32 and the filling pipe 38 are held in communication with each other, a supply state where the connection pipe 32 and the delivery pipe 42 are held in communication with each other, and a sealing state where the connection pipe 32, the filling pipe 38, and the delivery pipe 42 are held out of communication with one another.

Figure 2:
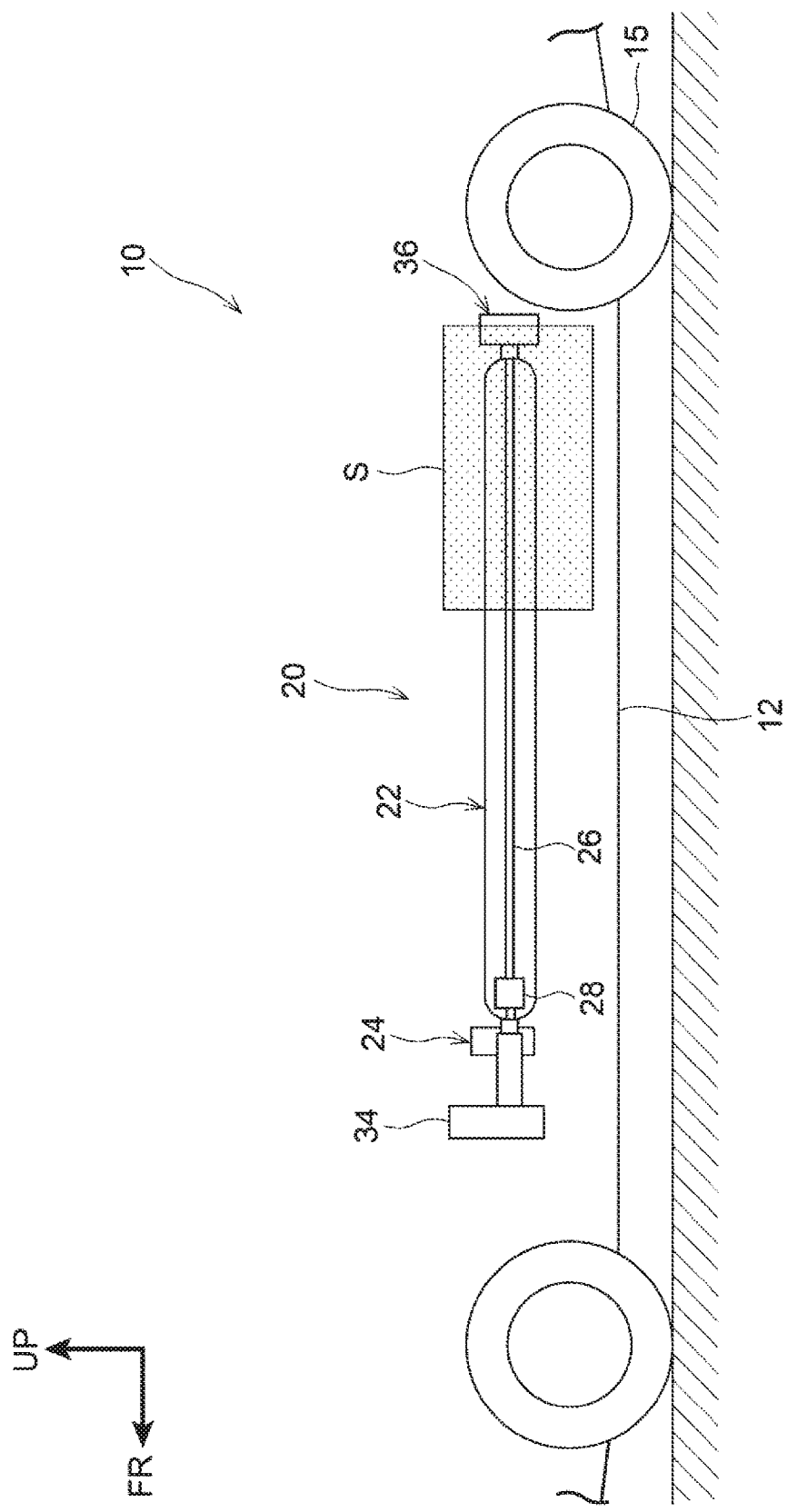
FIG. 2 is a lateral view of the vehicle and the gas supply system shown in FIG. 1 as viewed in a vehicle width direction.

As shown in FIG. 2, the height position of the chambers 22, the height position of the circulation pipe 26, and the height position of the fusible plug valve 28 are made, for example, approximately equal to one another, in the vertical direction of the vehicle.

[Operation and Effect]

Next, the operation of the gas supply system 20 according to the first embodiment will be described.

⟨Filling with Gas⟩

Figure 3:
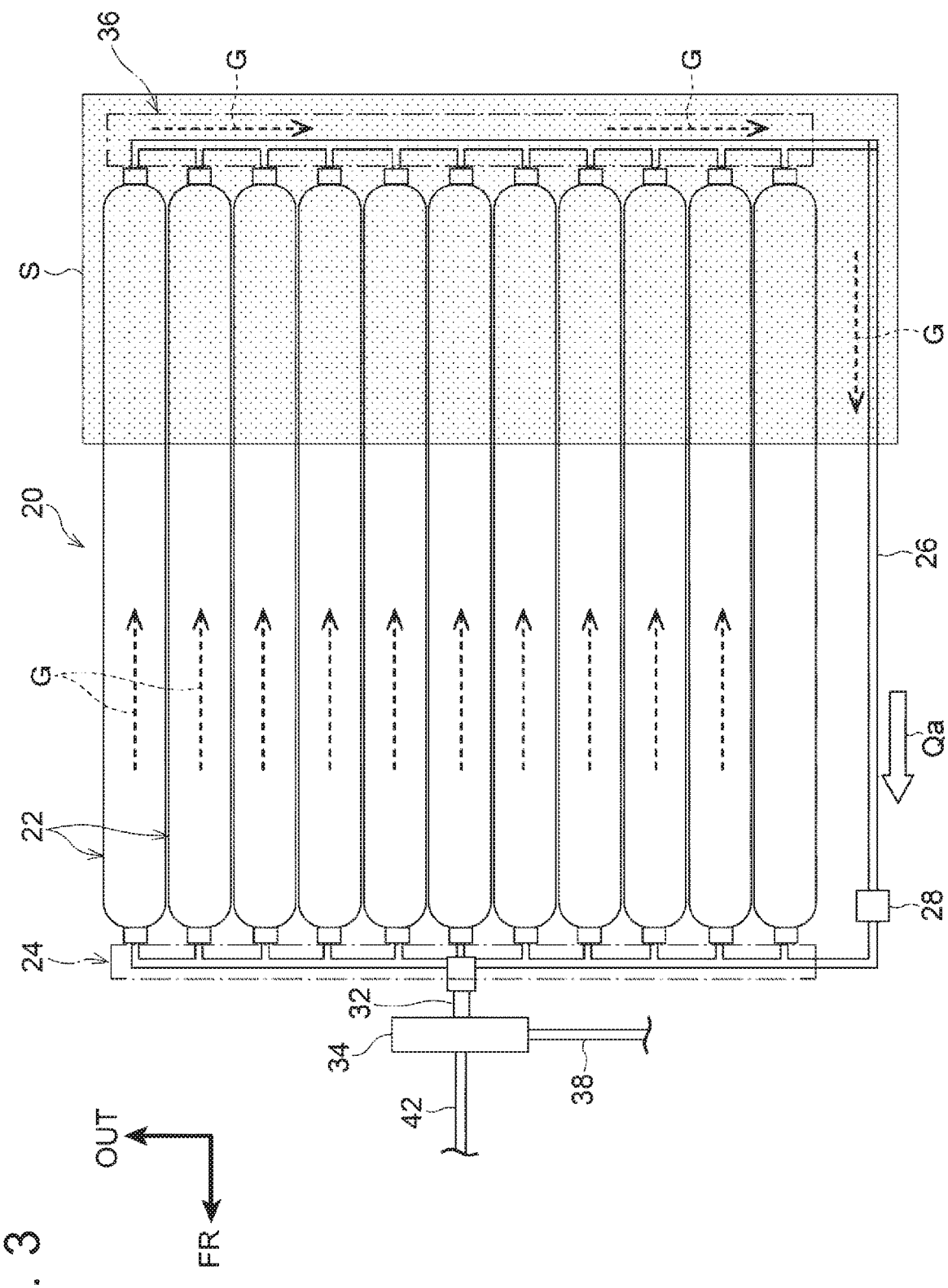
FIG. 3 is a plan view showing a state where gas is circulated through the gas supply system shown in FIG. 1.

In the gas supply system 20 shown in FIG. 3, when the chambers 22 are filled with hydrogen gas G, the changeover valve 34 is operated, and the filling pipe 38 and the connection pipe 32 are held in communication with each other. In this state, the hydrogen gas G caused to flow into the filling pipe 38 is caused to flow into the chambers 22 via the changeover valve 34, the connection pipe 32, and the front manifold 24. Thus, the chambers 22 are filled with hydrogen gas G.

⟨Supply of Gasp⟩

In the gas supply system 20, when hydrogen gas G is supplied to the fuel cell stack 16 (see FIG. 1), the changeover valve 34 is operated, and the connection pipe 32 and the delivery pipe 42 are held in communication with each other. In this state, the hydrogen gas G discharged from the chambers 22 is caused to flow into the delivery pipe 42 via the rear manifold 36, the circulation pipe 26, the fusible plug valve 28, the front manifold 24, and the connection pipe 32. Thus, hydrogen gas G is supplied to the fuel cell stack 16.

⟨High-Temperature State of Region S⟩

In the gas supply system 20, the temperature in the region S is assumed to have reached a high temperature equal to or higher than, for example, 150 (° C.). In this case, part of the circulation pipe 26 that is arranged in the region S is heated. Then, heat Qa (an amount of heat corresponding to the rise in temperature) in the circulation pipe 26 in the region S moves toward a front part of the vehicle that is lower in temperature than the region S, due to a heat gradient. In other words, heat Qa is transferred in the circulation pipe 26. Heat Qa is transferred from the front end portion of the circulation pipe 26 to the fusible plug valve 28. Then, the temperature of the fusible plug valve 28 rises through the supply of heat Qa thereto from the circulation pipe 26.

On the other hand, the chambers 22 are partially arranged in the region S. Therefore, when the temperature in the region S is high, the chambers 22 are heated. When the chambers 22 are heated, the hydrogen gas G inside the chambers 22 expands. Therefore, when the temperature of hydrogen gas G continues to rise inside the chambers 22 whose volume is constant, the pressure of hydrogen gas G becomes higher than at a room temperature (25 (° C.)).

Incidentally, as described already, the thermal conductivity of the circulation pipe 26 is higher than the thermal conductivity of the chambers 22. Therefore, the speed of heat transfer in the circulation pipe 26 is higher than the speed of heat transfer in the chambers 22.

When the temperature of the fusible plug valve 28 becomes equal to or higher than the predetermined opening temperature, the fusible plug valve 28 is opened by partially fusing. Therefore, the hydrogen gas G in the chambers 22 and the front manifold 24 is discharged from the fusible plug valve 28 to the outside (other than the front manifold 24). The discharge of this hydrogen gas G is started before the pressure of hydrogen gas G in the chambers 22 becomes higher than necessary, due to the difference in the speed of heat transfer. Thus, the pressure of the hydrogen gas G inside the chambers 22 is restrained from rising.

It should be noted herein that the fusible plug valve 28 is held in contact with the circulation pipe 26 apart from the chambers 22, in the gas supply system 20. Therefore, the heat Qa that is transferred from the circulation pipe 26 to the fusible plug valve 28 is not transferred to the chambers 22 to be consumed. Thus, the temperature of the fusible plug valve 28 is restrained from becoming unlikely to rise through the transfer of heat to the chambers 22. That is, the rise in temperature of the fusible plug valve 28 becomes unlikely to be suppressed before the temperature of the fusible plug valve 28 becomes equal to the predetermined opening temperature. Therefore, the start of the operation of discharging hydrogen gas G in the fusible plug valve 28 in its high-temperature state can be restrained from being delayed (the responsiveness of the operation can be restrained from falling).

Besides, in the gas supply system 20, the fusible plug valve 28 and the circulation pipe 26 are held in contact with each other. Thus, there is no need to separately provide a member that transfers heat from the circulation pipe 26 to the fusible plug valve 28. Therefore, the number of parts can be restrained from increasing.

Furthermore, in the gas supply system 20, the hydrogen gas G that has flowed from the chambers 22 to the circulation pipe 26 flows through the interior of the circulation pipe 26 and then to the front manifold 24, and hence is circulated. It should be noted herein that heat is transferred from the circulation pipe 26 to the fusible plug valve 28 when the temperature of part of the circulation pipe 26 becomes high, as described already. As described hitherto, the transfer of heat in the circulation pipe 26 makes it unnecessary to provide a pipeline for heat transfer and the circulation pipe 26 separately from each other. Therefore, the number of parts can be restrained from increasing.

Second Embodiment

Next, a gas supply system 50 as an exemplary vehicular gas supply system according to the second embodiment will be described. The gas supply system 50 is provided instead of the gas supply system 20, in the vehicle 10. Incidentally, components that are basically identical in configuration to those of the gas supply system 20 are denoted by the same reference symbols respectively, and the description thereof will be omitted.

Figure 4:
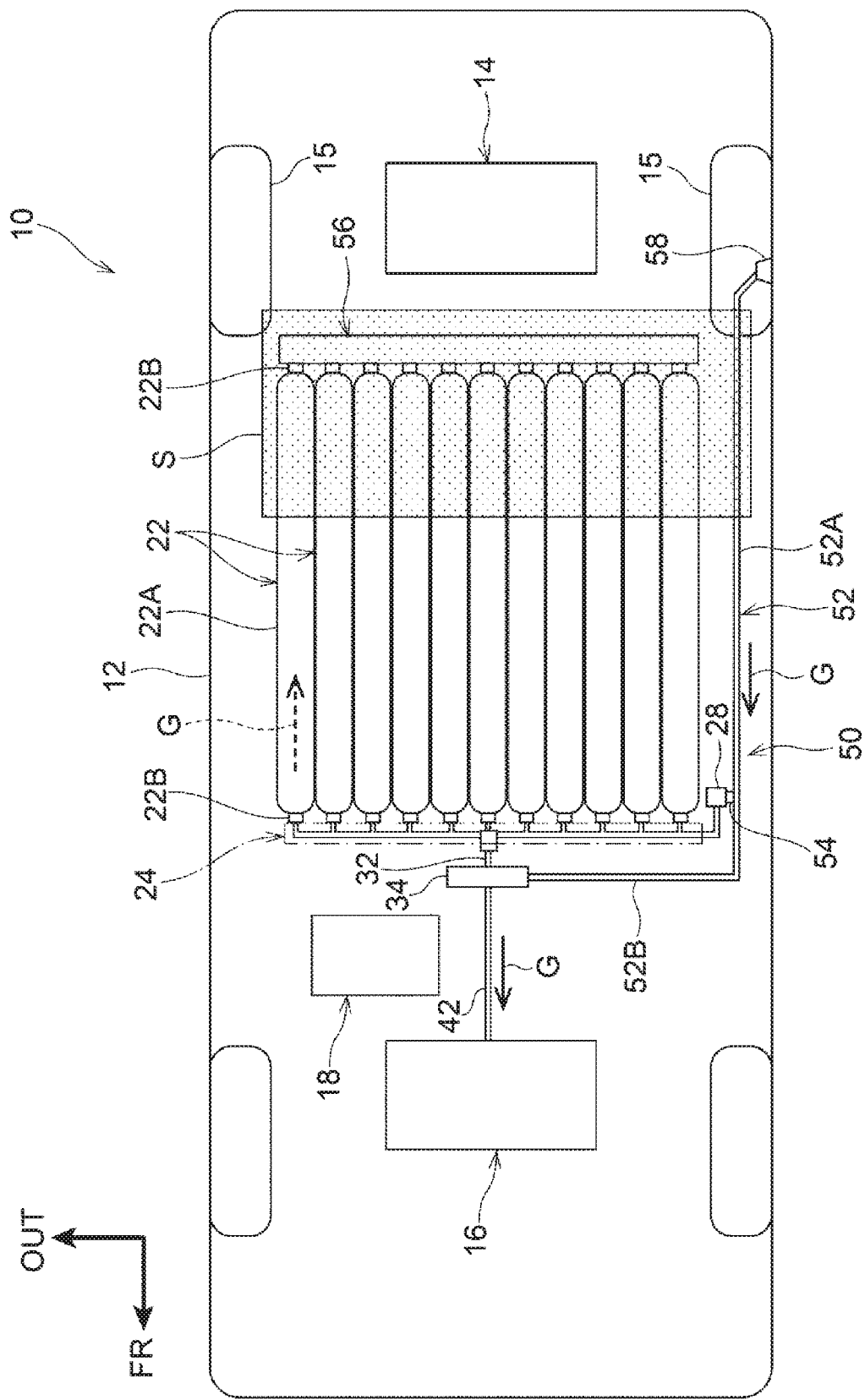
FIG. 4 is a plan view showing part of a vehicle to which a gas supply system according to the second embodiment is applied.

As shown in FIG. 4, the gas supply system 50 has the chambers 22, the front manifold 24, a filling pipe 52 as an exemplary pipeline and an exemplary filling pipeline, the fusible plug valve 28, and a transfer member 54. Besides, the gas supply system 50 is provided with the connection pipe 32, the changeover valve 34, an attachment portion 56, a filling port 58, and the delivery pipe 42. The gas supply system 50 is arranged, with respect to the vehicle, below the floor panel (not shown) that constitutes the floor portion of the vehicle interior of the vehicle 10, and is held by the holder portion (not shown).

⟨Attachment Portion⟩

The attachment portion 56 is configured as a member formed in the shape of a plate that is long in the vehicle width direction and thick in the longitudinal direction of the vehicle. Besides, the attachment portion 56 is arranged behind the 11 chambers 22 in the longitudinal direction of the vehicle. A dint (not shown) is formed at a front end portion of the attachment portion 56. The ferrules 22B on the rear side with respect to the vehicle are fitted in this dint. Thus, the attachment portion 56 supports rear end portions of the 11 chambers 22.

⟨Filling Port⟩

The filling port 58 is provided, for example, behind a center of the left portion of the vehicle 10 in the longitudinal direction of the vehicle. A supply nozzle connected to a hydrogen gas tank (not shown) can be connected to the filling port 58. The filling of hydrogen gas G is carried out via the filling port 58.

⟨Filling Pipe⟩

The filling pipe 52 has higher thermal conductivity than the chambers 22. For example, the filling pipe 52 is a pipe made of aluminum (or aluminum alloy). Besides, the filling pipe 52 is arranged apart from the chambers 22 and the fusible plug valve 28, outside (on the left side) in the vehicle width direction. Furthermore, the filling pipe 52 is configured as, for example, a member having a first pipe portion 52A and a second pipe portion 52B linked with each other substantially in the shape of L as viewed from above the vehicle.

The first pipe portion 52A is extended forward from the filling port 58 with respect to the vehicle, substantially along the longitudinal direction of the vehicle. For example, the length of the first pipe portion 52A in the longitudinal direction of the vehicle is longer than the length of each of the chambers 22 in the longitudinal direction of the vehicle. Besides, the first pipe portion 52A is arranged apart from the chambers 22 and the fusible plug valve 28, outside (on the left side) in the vehicle width direction. The second pipe portion 52B is extended inward in the vehicle width direction from a front end portion of the first pipe portion 52A, and is connected to the changeover valve 34.

As described hitherto, the filling pipe 52 is provided such that the chambers 22 can be filled with hydrogen gas G via the changeover valve 34 and the front manifold 24. In other words, the filling pipe 52 is filled with hydrogen gas G from a region behind the front manifold 24 with respect to the vehicle toward the front manifold 24. A rear end portion of the filling pipe 52 in the longitudinal direction of the vehicle is arranged in the region S.

Incidentally, the changeover valve 34 is connected to the front end portion of the connection pipe 32, an inner end portion of the filling pipe 52 in the vehicle width direction, and the rear end portion of the delivery pipe 42. Moreover, the changeover valve 34 is configured, for example, to make a changeover among three states, based on command information from the control unit 18. The three states are a filling state where the connection pipe 32 and the filling pipe 52 are held in communication with each other, a supply state where the connection pipe 32 and the delivery pipe 42 are held in communication with each other, and a sealing state where the connection pipe 32, the filling pipe 52, and the delivery pipe 42 are held out of communication with one another.

⟨Transfer Member⟩

For example, the transfer member 54 has higher thermal conductivity than the chambers 22 and the filling pipe 52. For example, the transfer member 54 is a member made of copper. In concrete terms, the transfer member 54 is formed by, for example, flexing both end portions of a copper plate in the vehicle width direction upward with respect to the vehicle. Attachment portions (not shown) that extend upward with respect to the vehicle are formed at both the end portions in the vehicle width direction respectively.

The attachment portion of the transfer member 54 located inside in the vehicle width direction is attached to the fusible plug valve 28 through the use of a screw (not shown). The attachment portion of the transfer member 54 located outside in the vehicle width direction is attached to the filling pipe 52 through the use of a screw (not shown). As described hitherto, the transfer member 54 is held in contact with the fusible plug valve 28 and the filling pipe 52, and transfers the heat of the filling pipe 52 from the filling pipe 52 to the fusible plug valve 28.

Figure 5:
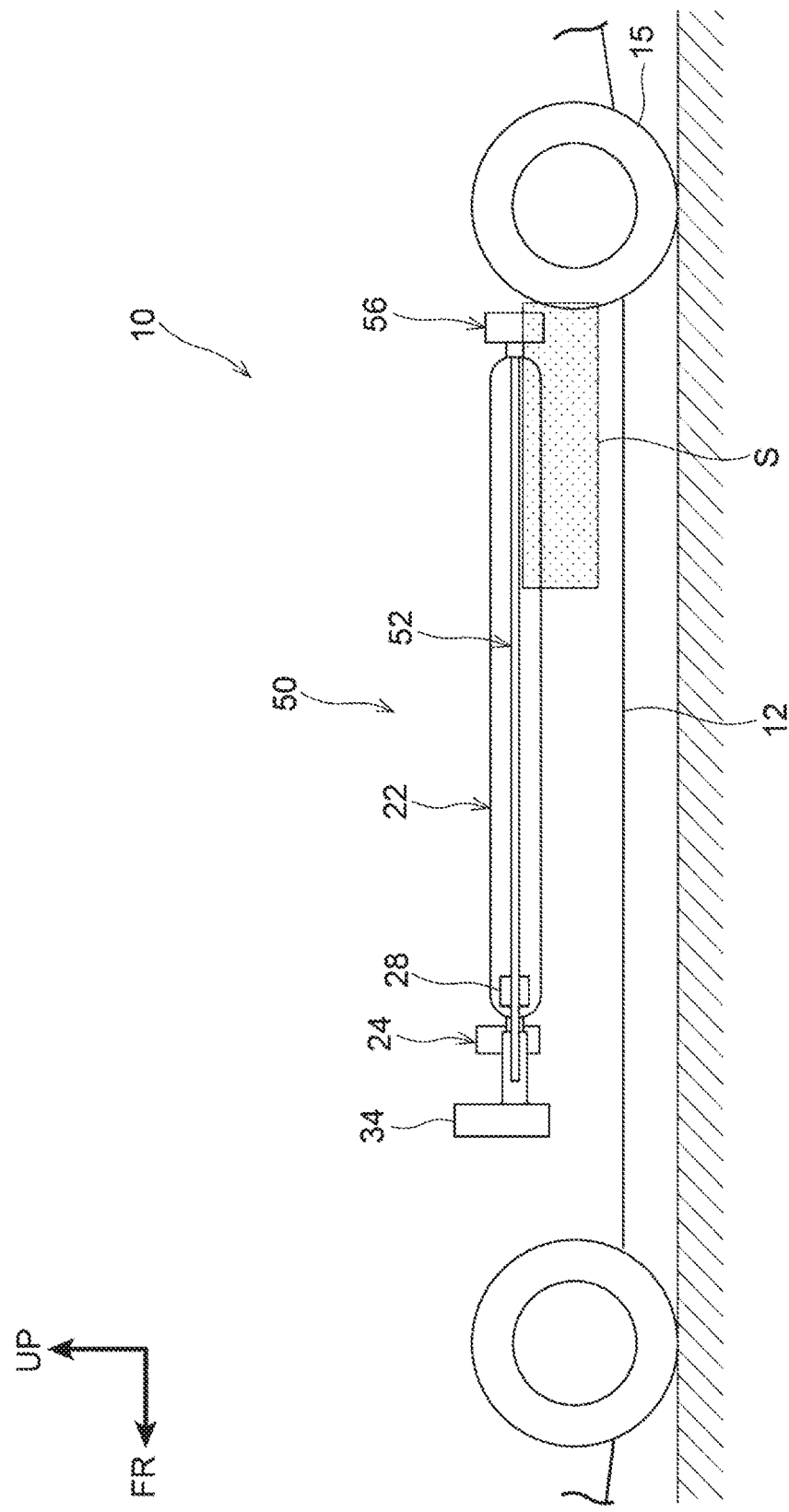
FIG. 5 is a lateral view of the vehicle and the gas supply system shown in FIG. 4 as viewed in the vehicle width direction.

As shown in FIG. 5, the height position of the chambers 22, the height position of the filling pipe 52, and the height position of the fusible plug valve 28 are made, for example, approximately equal to one another in the vertical direction of the vehicle.

[Operation and Effect]

Next, the operation and effect of the gas supply system 50 according to the second embodiment will be described.

⟨Filling of Gas⟩

Figure 6:
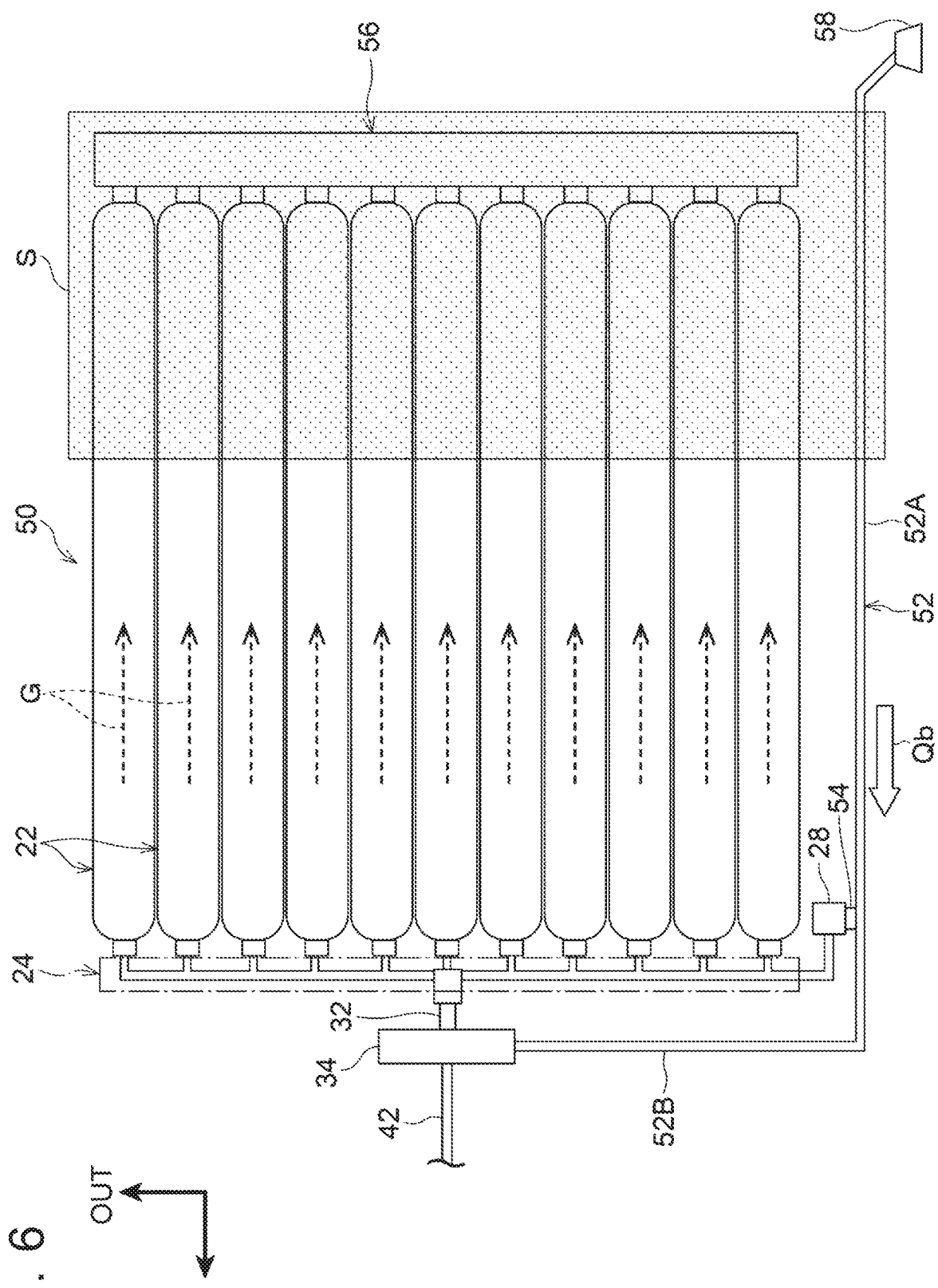
FIG. 6 is a plan view showing a state where gas is circulated through the gas supply system shown in FIG. 4.

In the gas supply system 50 shown in FIG. 6, when the chambers 22 are filled with hydrogen gas G, the changeover valve 34 is operated, and the filling pipe 52 and the connection pipe 32 are held in communication with each other. In this state, the hydrogen gas caused to flow into the filling pipe 52 is caused to flow into the chambers 22 via the changeover valve 34, the connection pipe 32, and the front manifold 24. Thus, the chambers 22 are filled with hydrogen gas G.

⟨Supply of Gas⟩

In the gas supply system 50, when hydrogen gas G is supplied to the fuel cell stack 16 (see FIG. 4), the changeover valve 34 is operated, and the connection pipe 32 and the delivery pipe 42 are held in communication with each other. In this state, the hydrogen gas G discharged from the chambers 22 is caused to flow into the delivery pipe 42 via the front manifold 24 and the connection pipe 32. Thus, hydrogen gas G is supplied to the fuel cell stack 16.

⟨High-Temperature State of Region S⟩

In the gas supply system 50, the temperature in the region S is assumed to have become equal to a high temperature equal to or higher than, for example, 150 (° C.). In this case, part of the filling pipe 52 that is arranged in the region S is heated. Then, heat Qb (an amount of heat corresponding to the rise in temperature) of the filling pipe 52 in the region S moves toward the front side of the vehicle that is lower in temperature than the region S, due to a heat gradient. In other words, heat Qb is transferred in the filling pipe 52. Heat Qb is transferred from a front portion of the first pipe portion 52A to the fusible plug valve 28 via the transfer member 54. Then, the temperature of the fusible plug valve 28 rises through the supply of heat Qb thereto from the first pipe portion 52A.

On the other hand, the chambers 22 are partially arranged in the region S. Therefore, when the temperature in the region S is high, the chambers 22 are heated. When the chambers 22 are heated, the hydrogen gas G inside the chambers 22 expands. Therefore, when the temperature of hydrogen gas G continues to rise inside the chambers 22 whose volume is constant, the pressure of hydrogen gas G becomes higher than at the room temperature.

Incidentally, the thermal conductivity of the filling pipe 52 is higher than the thermal conductivity of the chambers 22 as described already. Therefore, the speed of heat transfer in the filling pipe 52 is higher than the speed of heat transfer in the chambers 22.

When the temperature of the fusible plug valve 28 becomes equal to or higher than the predetermined opening temperature, the fusible plug valve 28 is opened by partially fusing. Therefore, the hydrogen gas G in the chambers 22 and the front manifold 24 is discharged from the fusible plug valve 28 to the outside (other than the front manifold 24). The discharge of this hydrogen gas G is started before the pressure of hydrogen gas G in the chambers 22 becomes higher than necessary, due to a difference in the speed of heat transfer. Thus, the pressure of hydrogen gas G inside the chambers 22 is restrained from rising.

It should be noted herein that the fusible plug valve 28 is spaced apart from the chambers 22 in the gas supply system 50. Furthermore, the fusible plug valve 28 is connected to the filling pipe 52 spaced apart from the chambers 22, via the transfer member 54. Therefore, the heat Qb that is transferred from the filling pipe 52 to the fusible plug valve 28 is not transferred to the chambers 22 to be consumed. Thus, the temperature of the fusible plug valve 28 is restrained from becoming unlikely to rise through the transfer of heat to the chambers 22. That is, the rise in temperature of the fusible plug valve 28 becomes unlikely to be suppressed before the temperature of the fusible plug valve 28 becomes equal to the predetermined opening temperature. Therefore, the start of the operation of discharging hydrogen gas G in the fusible plug valve 28 in its high-temperature state can be restrained from being delayed (the responsiveness of the operation can be restrained from falling).

Besides, in the gas supply system 50, the fusible plug valve 28 and the filling pipe 52 are spaced apart from each other, but the transfer member 54 is held in contact with the fusible plug valve 28 and the filling pipe 52. Thus, heat Qb is transferred from the filling pipe 52 to the fusible plug valve 28. In this manner, the use of the transfer member 54 makes it possible to transfer heat Qb from the filling pipe 52 to the fusible plug valve 28, regardless of the arrangement of the fusible plug valve 28 and the filling pipe 52. Therefore, the degree of freedom in arranging the fusible plug valve 28 and the filling pipe 52 can be enhanced. In addition, the transfer member 54 has higher thermal conductivity than the filling pipe 52. Therefore, part of the filling pipe 52 is protruded toward the fusible plug valve 28, and the speed of transfer of heat Qb is higher than in the configuration in which the filling pipe 52 and the fusible plug valve 28 are connected to each other.

Furthermore, in the gas supply system 50, the front manifold 24 is arranged in front of the chambers 22 in the longitudinal direction of the vehicle. Thus, the fusible plug valve 28 is also arranged on the front side in the longitudinal direction of the vehicle. Then, the filling pipe 52 is filled with hydrogen gas G toward the front manifold 24 located on the front side in the longitudinal direction of the vehicle. It should be noted herein that the heat Qb produced on the rear side of the vehicle is transferred to the fusible plug valve 28 via the filling pipe 52 when the temperature of the rear side of the vehicle becomes high. As described hitherto, the transfer of heat in the filling pipe 52 makes it unnecessary to provide a pipeline for heat transfer and the filling pipe 52 separately from each other. Therefore, the number of parts can be restrained from increasing.

Third Embodiment

Next, a gas supply system 60 as an exemplary vehicular gas supply system according to the third embodiment will be described. The gas supply system 60 is provided instead of the gas supply system 20, in the vehicle 10. Incidentally, components that are basically identical in configuration to those of the gas supply systems 20 and 50 are denoted by the same reference symbols respectively, and the description thereof will be omitted.

Figure 7:
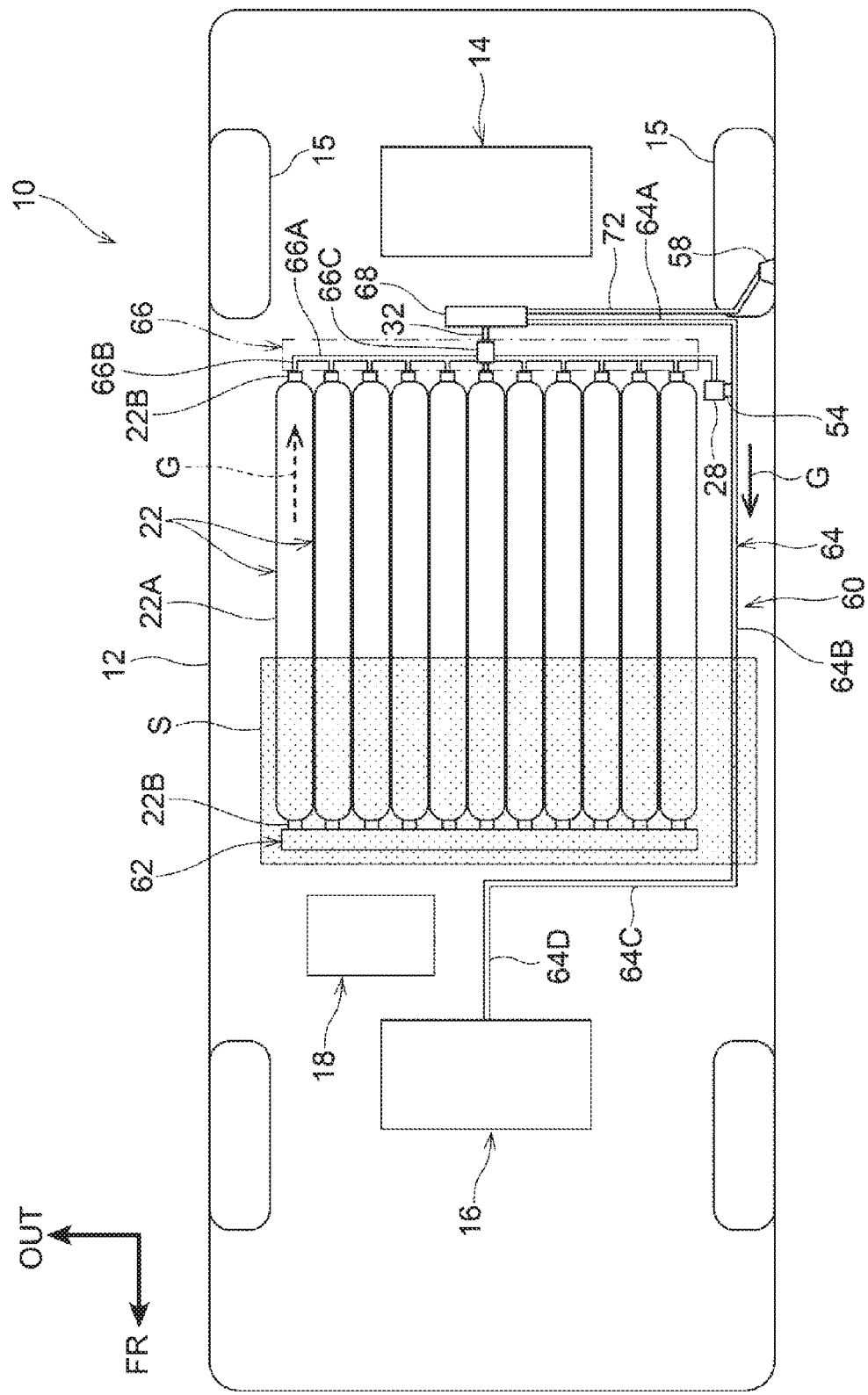
FIG. 7 is a plan view showing part of a vehicle to which a gas supply system according to the third embodiment is applied.

As shown in FIG. 7, the gas supply system 60 has the chambers 22, an attachment portion 62, a supply pipe 64 as an exemplary pipeline and an exemplary filling pipeline, the fusible plug valve 28, and the transfer member 54. Besides, the gas supply system 60 is provided with the connection pipe 32, a rear manifold 66 as an exemplary flow channel portion, a changeover valve 68, the filling port 58, and a filling pipe 72. The gas supply system 60 is arranged, with respect to the vehicle, below the floor panel (not shown) that constitutes the floor portion of the vehicle interior of the vehicle 10, and is held by the holder portion (not shown).

⟨Attachment Portion⟩

The attachment portion 62 is configured as a member formed in the shape of a plate that is long in the vehicle width direction and thick in the longitudinal direction of the vehicle. Besides, the attachment portion 62 is arranged in front of the 11 chambers 22 in the longitudinal direction of the vehicle. A dint (not shown) is formed at a rear end portion of the attachment portion 62. The ferrules 22B on the front side with respect to the vehicle are fitted in this dint. Thus, the attachment portion 62 supports front end portions of the 11 chambers 22. Furthermore, the attachment portion 62 is arranged in the region S.

⟨Rear Manifold⟩

The rear manifold 66 is arranged behind the 11 chambers 22 in the longitudinal direction of the vehicle. Besides, the rear manifold 66 has, for example, a single main pipe 66A extended in the vehicle width direction, a plurality of (11) branch pipes 66B branched off from the main pipe 66A, and a connection portion 66C. A left end portion of the main pipe 66A in the vehicle width direction is connected to the fusible plug valve 28.

Front end portions of the branch pipes 66B are connected to the ferrules 22B located on the rear side with respect to the vehicle, respectively. The connection portion 66C is provided at a central portion of the main pipe 66A in the vehicle width direction. Moreover, the connection portion 66C connects the central portion of the main pipe 66A and the front end portion of the connection pipe 32 to each other.

⟨Changeover Valve⟩

The changeover valve 68 is configured as a three-way valve. Besides, the changeover valve 68 is connected to the rear end portion of the connection pipe 32, the supply pipe 64 that will be described later, and the filling pipe 72 that will be described later. Moreover, the changeover valve 68 is configured to, for example, make a changeover among three states, based on command information from the control unit 18. The three states are a supply state where the connection pipe 32 and the supply pipe 64 are held in communication with each other, a filling state where the connection pipe 32 and the filling pipe 72 are held in communication with each other, and a sealing state where the connection pipe 32, the supply pipe 64, and the filling pipe 72 are held out of communication with one another.

⟨Filling Pipe⟩

The filling pipe 72 links the filling port 58 and the changeover valve 68 with each other in the vehicle width direction, for example, behind the supply pipe 64 in the longitudinal direction of the vehicle.

⟨Supply Pipe⟩

The supply pipe 64 has higher thermal conductivity than the chambers 22. For example, the supply pipe 64 is a pipe made of aluminum (or aluminum alloy). Besides, the supply pipe 64 is arranged apart from the chambers 22 and the fusible plug valve 28, outside (on the left side) in the vehicle width direction. Furthermore, the supply pipe 64 is configured as, for example, a member obtained by linking a first pipe portion 64A, a second pipe portion 64B, a third pipe portion 64C, and a fourth pipe portion 64D with one another substantially in the shape of a crank, as viewed from above the vehicle.

The first pipe portion 64A is extended outward (leftward) in the vehicle width direction from the changeover valve 68. The second pipe portion 64B is extended forward with respect to the vehicle from a left end portion of the first pipe portion 52A along the longitudinal direction of the vehicle. Besides, the second pipe portion 64B is arranged apart from the fusible plug valve 28, outside the fusible plug valve 28 in the vehicle width direction. The third pipe portion 64C is arranged in front of the attachment portion 62 with respect to the vehicle, and is extended from a front end portion of the second pipe portion 64B toward a center in the vehicle width direction. The fourth pipe portion 64D is extended from an end portion of the third pipe portion 64C on a central side in the vehicle width direction toward the fuel cell stack 16.

As described hitherto, the supply pipe 64 is provided such that the hydrogen gas G that has been caused to flow in from the chambers 22 via the rear manifold 66 and the changeover valve 68 can be supplied toward the fuel cell stack 16. In other words, the supply pipe 64 is extended forward with respect to the vehicle from the rear manifold 66, and is supplied with hydrogen gas G from the rear manifold 66. A front portion of the second pipe portion 64B with respect to the center in the longitudinal direction of the vehicle is arranged in the region S.

⟨Transfer Member⟩

Both end portions of the transfer member 54 in the vehicle width direction are attached to the fusible plug valve 28 and the supply pipe 64 through the use of screws (not shown). In this manner, the transfer member 54 is held in contact with the fusible plug valve 28 and the supply pipe 64, and transfers the heat of the supply pipe 64 from the supply pipe 64 to the fusible plug valve 28.

Figure 8:
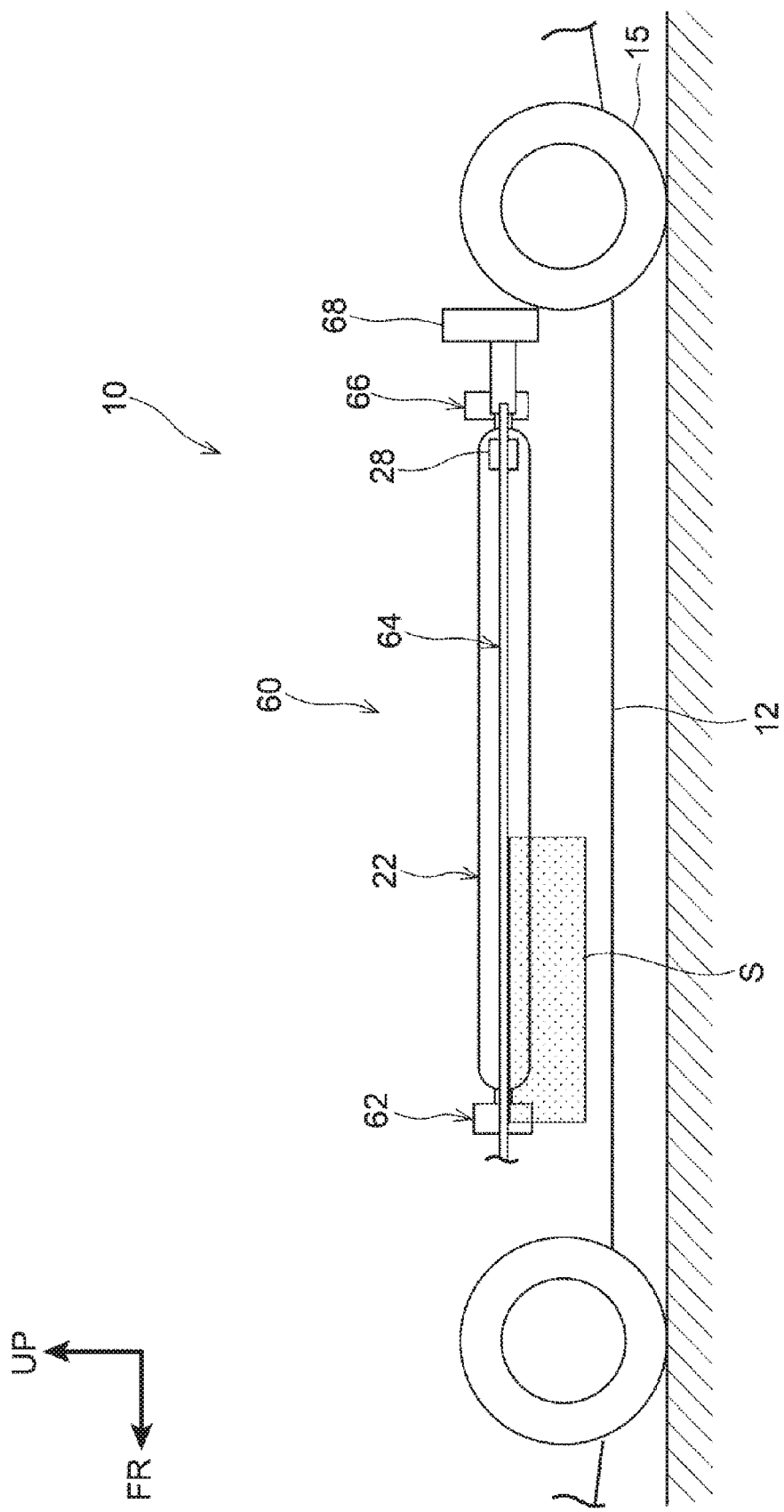
FIG. 8 is a lateral view of the vehicle and the gas supply system shown in FIG. 7 as viewed in the vehicle width direction.

As shown in FIG. 8, the height position of the chambers 22, the height position of the supply pipe 64, and the height position of the fusible plug valve 28 are made, for example, approximately equal to one another in the vertical direction of the vehicle.

[Operation and Effect]

Next, the operation and effect of the gas supply system 60 according to the third embodiment will be described.

⟨Filling of Gas⟩

Figure 9:
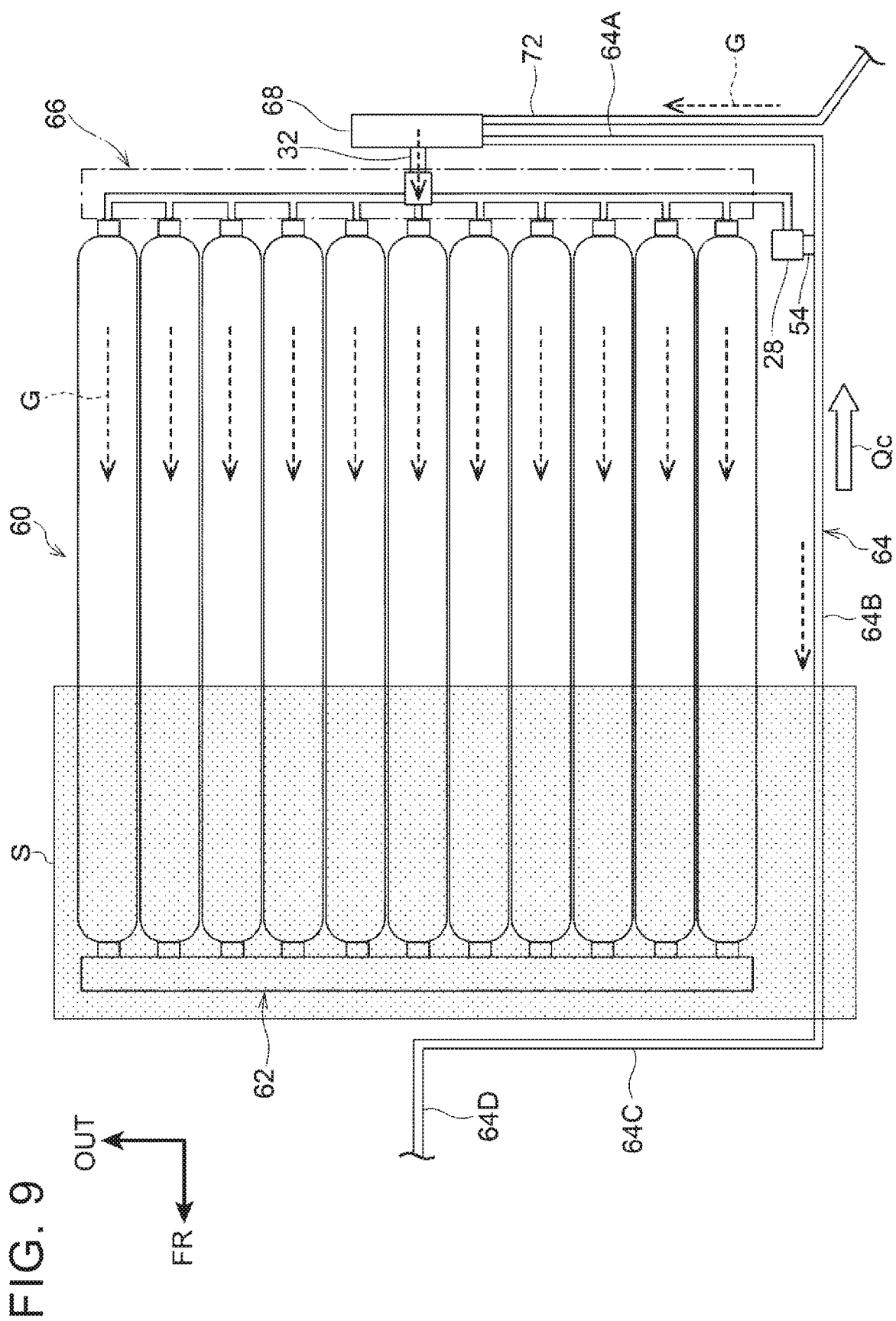
FIG. 9 is a plan view showing a state where gas is circulated through the gas supply system shown in FIG. 7.

In the gas supply system 60 shown in FIG. 9, when the chambers 22 are filled with hydrogen gas G, the changeover valve 68 is operated, and the filling pipe 72 and the connection pipe 32 are held in communication with each other. In this state, the hydrogen gas G caused to flow into the filling pipe 72 is caused to flow into the chambers 22 via the changeover valve 68, the connection pipe 32, and the rear manifold 66. Thus, the chambers 22 are filled with hydrogen gas G.

⟨Supply of Gas⟩

In the gas supply system 60, when hydrogen gas G is supplied to the fuel cell stack 16 (see FIG. 7), the changeover valve 68 is operated, and the connection pipe 32 and the supply pipe 64 are held in communication with each other. In this state, the hydrogen gas G discharged from the chambers 22 is caused to flow into the supply pipe 64 via the rear manifold 66 and the changeover valve 68. Thus, hydrogen gas G is supplied to the fuel cell stack 16.

⟨High-Temperature State of Region⟩

In the gas supply system 60, the temperature in the region S on the front side of the vehicle is assumed to have become a high temperature equal to or higher than, for example, 150 (° C.). In this case, part of the supply pipe 64 that is arranged in the region S is heated. Then, heat Qc (an amount of heat corresponding to the rise in temperature) of the supply pipe 64 in the region S moves toward the rear side of the vehicle that is lower in temperature than the region S, due to a heat gradient. In other words, heat Qc is transferred in the supply pipe 64. Heat Qc is transferred from a rear portion of the second pipe portion 64B to the fusible plug valve 28 via the transfer member 54. Then, the temperature of the fusible plug valve 28 rises through the supply of heat Qc thereto from the supply pipe 64.

On the other hand, the chambers 22 are partially arranged in the region S. Therefore, when the temperature in the region S is high, the chambers 22 are heated. When the chambers 22 are heated, the hydrogen gas G inside the chambers 22 expands. Therefore, when the temperature of hydrogen gas G continues to rise inside the chambers 22 whose volume is constant, the pressure of hydrogen gas G tends to become higher than at the room temperature. Incidentally, as described already, the supply pipe 64 has higher thermal conductivity than the chambers 22. Therefore, the speed of heat transfer in the supply pipe 64 is higher than the speed of heat transfer in the chambers 22.

When the temperature of the fusible plug valve 28 becomes equal to or higher than the predetermined opening temperature, the fusible plug valve 28 is opened by partially fusing. Therefore, the hydrogen gas G in the chambers 22 and the rear manifold 66 is discharged from the fusible plug valve 28 to the outside (other than the rear manifold 66). The discharge of this hydrogen gas G is started before the pressure of hydrogen gas G in the chambers 22 becomes higher than necessary, due to a difference in the speed of heat transfer. Thus, the pressure of hydrogen gas G inside the chambers 22 is restrained from rising.

It should be noted herein that the fusible plug valve 28 is spaced apart from the chambers 22 in the gas supply system 60. Furthermore, the fusible plug valve 28 is connected to the supply pipe 64 spaced apart from the chambers 22, via the transfer member 54. Therefore, the heat Qc transferred from the supply pipe 64 to the fusible plug valve 28 is not transferred to the chambers 22 to be consumed. Thus, the temperature of the fusible plug valve 28 is restrained from becoming unlikely to rise through the transfer of heat to the chambers 22. That is, the rise in temperature of the fusible plug valve 28 becomes unlikely to be suppressed before the temperature of the fusible plug valve 28 becomes equal to the predetermined opening temperature. Therefore, the start of the operation of discharging hydrogen gas G in the fusible plug valve 28 in its high-temperature state can be restrained from being delayed (the responsiveness of the operation can be restrained from falling).

Besides, in the gas supply system 60, the fusible plug valve 28 and the supply pipe 64 are spaced apart from each other, but the transfer member 54 is held in contact with the fusible plug valve 28 and the supply pipe 64. Thus, heat Qc is transferred from the supply pipe 64 to the fusible plug valve 28. In this manner, the use of the transfer member 54 makes it possible to transfer heat Qc from the supply pipe 64 to the fusible plug valve 28, regardless of the arrangement of the fusible plug valve 28 and the supply pipe 64. Therefore, the degree of freedom in arranging the fusible plug valve 28 and the supply pipe 64 can be enhanced. In addition, the transfer member 54 has higher thermal conductivity than the supply pipe 64. Therefore, part of the supply pipe 64 is protruded toward the fusible plug valve 28, and the speed of transfer of heat Qc is higher than in the configuration in which the supply pipe 64 and the fusible plug valve 28 are connected to each other.

Furthermore, in the gas supply system 60, the rear manifold 66 is arranged behind the chambers 22 in the longitudinal direction of the vehicle. Thus, the fusible plug valve 28 is also arranged on the rear side in the longitudinal direction of the vehicle. Then, the supply pipe 64 is filled with hydrogen gas G from the front side of the vehicle toward the rear manifold 66 located on the rear side in the longitudinal direction of the vehicle. It should be noted herein that the heat Qc produced on the front side of the vehicle is transferred to the fusible plug valve 28 via the supply pipe 64 when the temperature of the front side of the vehicle, becomes high. As described hitherto, the transfer of heat in the supply pipe 64 makes it unnecessary to provide a pipeline for heat transfer and the supply pipe 64 separately from each other. Therefore, the number of parts can be restrained from increasing.

Incidentally, the disclosure is not limited to the above-mentioned embodiments.

The number of chambers 22 is not limited to 11, but may be one, two or more except 11. By the same token, as is the case with the chambers 22, the number of branch pipes 24B, 36B, or 66B is not limited to 11 either, but may be one, two or more except 11.

In the gas supply system 20, the circulation pipe 26 may be connected to a region different from that region of the main pipe 24A of the front manifold 24 which is provided with the fusible plug valve 28, and the transfer member 54 may be attached to the circulation pipe 26 and the fusible plug valve 28.

In the gas supply system 50, the transfer member 54 may be dispensed with, and the fusible plug valve 28 and the filling pipe 52 may be held in communication with each other.

In the gas supply system 60, the transfer member 54 may be dispensed with, and the fusible plug valve 28 and the supply pipe 64 may be held in contact with each other.

As an example of the discharge portion, the fusible plug valve 28 that partially fuses to discharge hydrogen gas G when the temperature thereof becomes equal to or higher than the predetermined opening temperature has been described, but the discharge portion may not necessarily be the fusible plug valve 28. For example, the discharge portion may be configured to open a flow channel through deformation (bending deformation or the like) of a member when the temperature of the discharge portion becomes equal to or higher than the predetermined opening temperature.

In some embodiments, the transfer member 54 has higher thermal conductivity than the chambers 22, but a transfer member whose thermal conductivity is equal to or lower than that of the chambers 22 can also be used. Besides, the transfer member 54 may not necessarily assume the shape of a plate such as a copper plate, but may assume the shape of a rod, a cylinder, or a block as long as the thermal capacity thereof falls within a predetermined range. Furthermore, the provision of the single transfer member 54 is not indispensable, but a plurality of transfer members 54 may be provided. In addition, the transfer member 54 may not necessarily be attached to the respective members through the use of fastening members such as screws or the like, but may be attached thereto through the use of an adhesive. In addition, the transfer member 54 may have lower thermal conductivity than the filling pipe 52 or the supply pipe 64.

The height position of the chambers 22, the height position of the circulation pipe 26, and the height position of the fusible plug valve 28 may not necessarily be approximately equal to one another, but the chambers 22, the circulation pipe 26, and the fusible plug valve 28 may be arranged offset from one another in the vertical direction of the vehicle. The height position of the chambers 22, the height position of the filling pipe 52, and the height position of the fusible plug valve 28 may not necessarily be approximately equal to one another, but the chambers 22, the filling pipe 52, and the fusible plug valve 28 may be arranged offset from one another in the vertical direction of the vehicle. The height position of the chambers 22, the height position of the supply pipe 64, and the height position of the fusible plug valve 28 may not necessarily be approximately equal to one another, but the chambers 22, the supply pipe 64, and the fusible plug valve 28 may be arranged offset from one another in the vertical direction of the vehicle.

The fusible plug valve 28 may not necessarily be spaced apart from the chambers 22 in the vehicle width direction, but may be spaced apart therefrom in the vertical direction of the vehicle.

The gas may not necessarily be hydrogen gas G, but may be another gas such as oxygen, air, or the like.

Although the exemplary vehicular gas supply system according to each of the embodiments and modification examples of the disclosure has been described above. However, it goes without saying that these respective embodiments and modification examples may be used by being appropriately combined with one another, and that the disclosure can be carried out in various aspects within such a range as not to depart from the gist thereof.

What is claimed is:

1. A vehicular gas supply system comprising:
   a container that stores gas;
   a flow channel portion that is connected to the container and through which gas flows;
   a pipeline that is provided such that gas can flow through the flow channel portion, and that has higher thermal conductivity than the container; and
   a discharge portion that is provided at the flow channel portion apart from the container, that has heat transferred thereto from the pipeline, and that discharges gas in the container and gas in the flow channel portion to an outside by being opened at a temperature equal to or higher than a predetermined opening temperature.

2. The vehicular gas supply system according to claim 1, wherein
   the discharge portion and the pipeline are held in contact with each other.

3. The vehicular gas supply system according to claim 1, further comprising:
   a transfer member that is held in contact with the discharge portion and the pipeline and that transfers heat from the pipeline to the discharge portion.

4. The vehicular gas supply system according to claim 1, wherein
   the pipeline is a circulation pipeline that circulates the gas that has flowed from the container to the flow channel portion.

5. The vehicular gas supply system according to claim 1, wherein
   the flow channel portion is arranged in front of the container in a longitudinal direction of a vehicle, and
   the pipeline is a filling pipeline that is filled with gas from a region behind the flow channel portion with respect to the vehicle toward the flow channel portion.

6. The vehicular gas supply system according to claim 1, wherein
   the flow channel portion is arranged behind the container in a longitudinal direction of a vehicle, and
   the pipeline is a supply pipeline that is extended forward with respect to the vehicle from the flow channel portion and that is supplied with gas from the flow channel portion.

\* \* \* \* \*